E. H. FRENCH.
PROCESS OF PRODUCING PYROLIGNEOUS ACID.
APPLICATION FILED SEPT. 5, 1911. RENEWED DEC. 23, 1914.
1,150,589.
Patented Aug. 17, 1915.
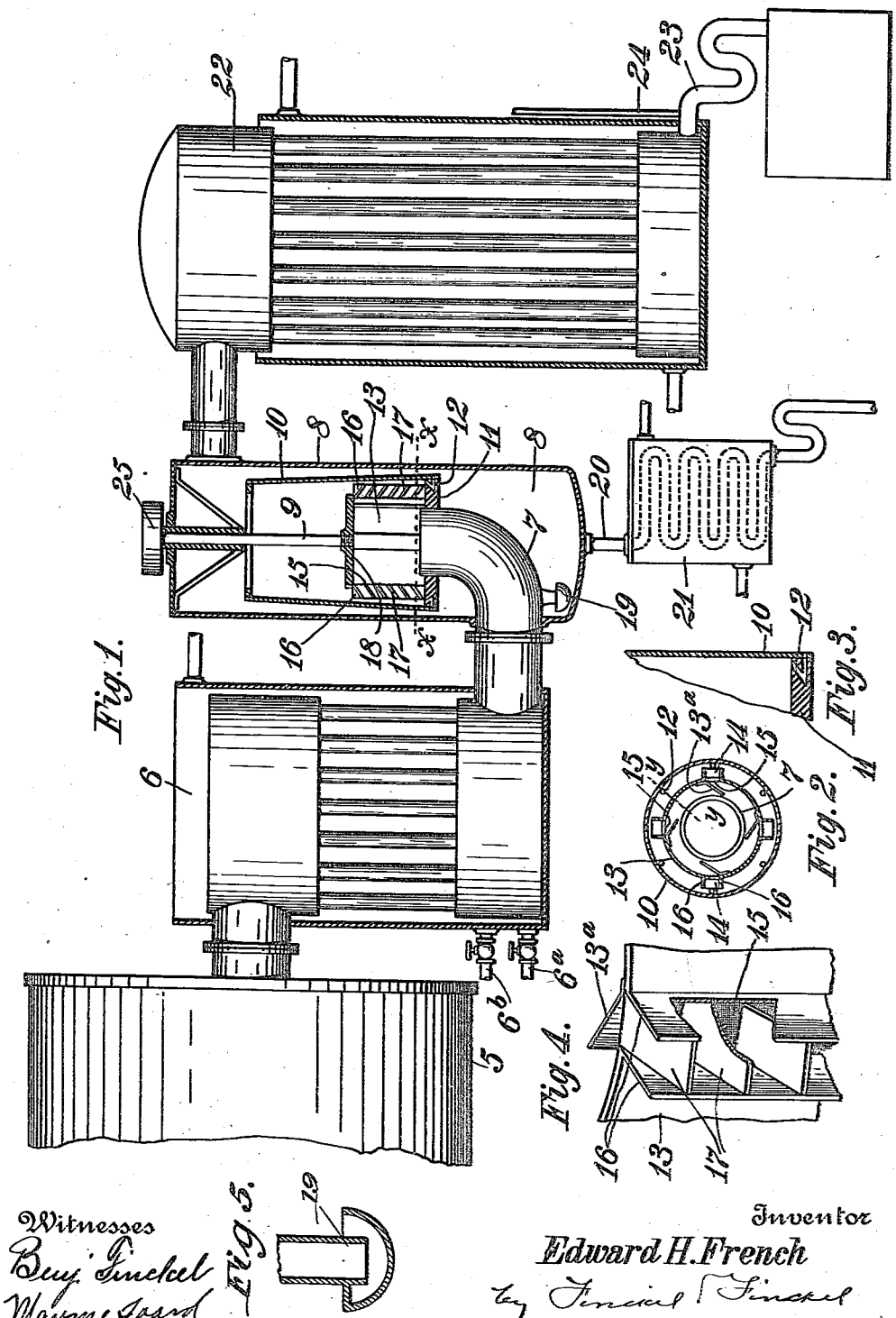
Witnesses
Benj. Finckel
Mayme Gaard
Inventor
Edward H. French
by Finckel & Finckel
his Attorneys

UNITED STATES PATENT OFFICE.

EDWARD H. FRENCH, OF SMETHPORT, PENNSYLVANIA.

PROCESS OF PRODUCING PYROLIGNEOUS ACID.

1,150,589.

Specification of Letters Patent.

Patented Aug. 17, 1915.

Original application filed November 2, 1910, Serial No. 590,324. Divided and this application filed September 5, 1911, Serial No. 647,620. Renewed December 23, 1914. Serial No. 878,985.

*To all whom it may concern:*

Be it known that I, EDWARD H. FRENCH, a citizen of the United States, residing at Smethport, in the county of McKean and State of Pennsylvania, have invented a certain new and useful Improvement in Processes of Producing Pyroligneous Acid, of which the following is a specification.

In order to meet the market requirements of acetate of lime, it is important to produce a product that contains from eighty to eighty five per centum of acetate of lime and proportionate percentages of other acetates. To accomplish this result, in the present manufacture, it is the commercial practice in this country to re-distil the crude pyroligneous acid from the tars and oils dissolved therein. This re-distillation requires a large outlay of money for copper stills used in the distillation process and the continuous use of a large amount of heat which results in considerable loss of product because of a practical inability to volatilize the acid completely from the tar.

The object generally, of this invention is to obtain the redistillation of pyroligneous acid obtained by the destructive distillation of wood, and particularly to obtain a product which is sufficiently pure for direct conversion by neutralization with an appropriate base as, for example, lime, into gray acetate of lime and other acetates.

The invention consists in the process herein set forth, one form of apparatus being herein particularly shown and described for carrying out the process.

In the accompanying drawing showing said apparatus Figure 1 is a general view partly in section and partly in elevation illustrating the apparatus. Fig. 2 is a horizontal section on the line x—x Fig. 1. Fig. 3 is a detail on the line y—y Fig. 2. Fig. 4 is a fragmentary perspective view of a portion of the centrifugal separator.

The apparatus shown includes a fractionating condenser 6 placed in the vapor line adjacent the retort 5. The fractionating condenser 6 has cold and hot water pipes $6^a$ and $6^b$ for regulating the temperature of the condenser. The fractionating condenser discharges by means of an elbow 7 into a chamber 8. Journaled in the upper end of the chamber 8 is a shaft 9 having secured to it, through an auxiliary drum to be described, a large or main drum 10 that tapers upward. The drum 10 has a bottom 11 provided with a central opening into which the open and discharging end of the elbow 7 projects said bottom rotating with said drum and around the said end of the elbow. The bottom of the drum immediately next the upright wall thereof is provided with a plurality of openings 12 of angular form, that is to say they extend first inward and downward toward the axis of motion of the bottom and thence outward horizontally to the rim of the bottom where they discharge into the chamber 8. Erected upon the bottom 10 and rigidly connected therewith is the auxiliary drum 13 hereinbefore referred to, said drum having in its side a plurality of vertical slits or openings 14 provided with wire screens 15 of fine mesh. At the interior of the auxiliary drum these slits 14 are each parallelly flanked at the corresponding side by deflectors $13^a$ adapted, when the drum is rotated in the direction opposing them, to direct vapors toward the openings 14 and through the screen. At the exterior of the auxiliary drum the slits 14 are each parallelly flanked at both sides by walls 16, 16, forming for the opening a sort of spout so as to bring the discharge near to the inner side of the main drum 10. Secured between each pair of said walls 16, 16, and beyond the screen is a plurality of horizontally extending slats 17 placed rather close together and inclined from their inner edge outwardly and downwardly as shown. The upper end of the auxiliary drum is closed by a solid head 18 fixed thereto and the driven shaft 9 is fixedly connected with this shaft so that both the main and auxiliary drum shall rotate together as one. The lower side of the elbow is provided with a bell trap 19 through which any condensate accumulating in the elbow 7 can escape into chamber 8 and thence to discharge 20. The lower end of the chamber 8 is provided with the said discharge pipe 20 the latter being formed in several coils and inclosed in a cooling chamber 21. The upper end of the chamber 8 is connected by means of a pipe with a vapor condenser 22 of usual or suitable construction.

23 designates the discharge of the liquor of condensation, said discharge having a goose neck trap, and 24 is a vent for vapors not condensed.

In practice the desired fractionation is obtained in the condenser 6 by regulating the temperature therein so that it shall be just sufficient to obtain the minimum amount of watery liquid separating with the tarry liquid coming from the chamber 8. This temperature varies in different circumstances but is governed by the result—the minimum amount of watery liquid—which is noted by observing the discharge from the chamber 8. In average circumstances this temperature is about 120 degrees centigrade or 248 degrees Fahrenheit. The tars and oils are only partially removed from the vapors in the condenser 6 and liquefied particles not caught in the condenser are carried into the chamber 8 by the sweep of the vapors.

The shaft 9 is driven by a belt applied to the pulley 25 on the upper end of the shaft beyond the chamber 8 and in the direction hereinbefore indicated, the vapors in said chamber being impelled by centrifugal action through the screened and slatted openings in the sides of the auxiliary drum against the solid walls of the main drum. The effect of this operation is that tars and oils in the vapors accumulate upon the walls of the main drum 10 and trickle down to the small angular discharge holes 12 at the lower end thereof. Because the said holes in their inclined portions extend inward and the flow therein is in a direction contrary to that of the centrifugal force they are kept filled forming a liquid seal and thereby preventing the discharge of uncondensed vapors. The action of centrifugal force upon the material in the horizontal parts of the holes draws upon the material in the inclined parts so that a discharge of the tars and oils is effected although the inclined parts are ordinarily kept filled during the operation. From the exterior of the bottom of the drum the tars and oils drop or flow to the bottom of the chamber 8 where they are trapped off and cooled. The upwardly tapering form of the main drum prevents a too free flow of the vapors upward in that drum hence time is gained for the efficient extraction of the liquefied tars and oils by centrifugal action. The uncondensed portions of the vapors containing the acetone, alcohol and acetic acid pass upward through the open end of the main drum and into the condenser 22 and from this the liquor of condensation or pyroligneous acid—so called—passes into the goose neck discharge 23. The pyroligneous acid thus obtained can, without redistillation be neutralized in the usual way with a suitable base—lime for example—to produce the commercial acetate.

The application for this patent was a division of that filed by me Nov. 2, 1910, Serial No. 590,324.

What I claim is:

1. The method of treating the vapors obtained from the destructive distillation of wood for the purpose of obtaining pyroligneous acid, consisting in first fractionally condensing such vapors at a temperature approximating one hundred and twenty degrees centigrade so as to liquefy and separate a portion of the tars and oils present in the vapors, then removing the tars and oils left suspended in the vapors by centrifugal action and finally condensing the remaining normally condensable vapors, substantially as described.

2. The method of treating the vapors obtained from the destructive distillation of wood for the purpose of obtaining pyroligneous acid commercially free from tars and oils, consisting in first fractionally condensing such vapors so as to liquefy and separate a portion of the tars and oils present in the vapors, then removing the tars and oils left suspended in the vapors by centrifugal action and finally condensing the remaining normally condensable vapors, substantially as described.

EDWARD H. FRENCH.

Witnesses:
F. D. GALLUP,
HALLIE A. WALKER.